United States Patent
Au et al.

(10) Patent No.: US 10,582,494 B2
(45) Date of Patent: Mar. 3, 2020

(54) SYSTEM AND METHOD FOR ADAPTIVE TRANSMISSION TIME INTERVAL (TTI) STRUCTURE

(71) Applicant: HUAWEI TECHNOLOGIES CO., LTD., Shenzhen (CN)

(72) Inventors: Kelvin Kar Kin Au, Kanata (CA); Jianglei Ma, Ottawa (CA); Liqing Zhang, Ottawa (CA); Zhihang Yi, Ottawa (CA); Hosein Nikopour, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/648,186

(22) Filed: Jul. 12, 2017

(65) Prior Publication Data
US 2017/0318582 A1 Nov. 2, 2017

Related U.S. Application Data

(63) Continuation of application No. 14/823,873, filed on Aug. 11, 2015, now Pat. No. 9,743,403, which is a
(Continued)

(51) Int. Cl.
*H04W 72/04* (2009.01)
*H04W 28/02* (2009.01)
*H04W 88/08* (2009.01)

(52) U.S. Cl.
CPC ... *H04W 72/0446* (2013.01); *H04W 28/0205* (2013.01); *H04W 72/042* (2013.01); *H04W 88/08* (2013.01)

(58) Field of Classification Search
CPC ........... H04W 72/0446; H04W 72/042; H04W 28/0205; H04W 88/08
See application file for complete search history.

(56) References Cited

U.S. PATENT DOCUMENTS 6,240,094 B1 * 5/2001 Schneider ............. H04L 1/0002
370/412
7,065,051 B2 6/2006 Airy et al.
(Continued)

FOREIGN PATENT DOCUMENTS

CN 101292456 A 5/2008
CN 101223720 A 7/2008
(Continued)

OTHER PUBLICATIONS

3GPP, 3rd Generation Partnership Project; Technical Specification Group Radio Access Network; Evolved Universal Terrestrial Radio Access (E-UTRA); Physical channels and modulation (Release 12), 3GPP TS 36.211 V12.1.0, Mar. 2014, 120 pages.
(Continued)

*Primary Examiner* — Hashim S Bhatti
(74) *Attorney, Agent, or Firm* — Slater Matsil, LLP

(57) ABSTRACT

Methods and devices are provided for communicating data in a wireless channel. In one example, a method includes adapting the transmission time interval (TTI) length of transport container for transmitting data in accordance with a criteria. The criteria may include (but is not limited to) a latency requirement of the data, a buffer size associated with the data, a mobility characteristic of a device that will receive the data. The TTI lengths may be manipulated for a variety of reasons, such as for reducing overhead, satisfy quality of service (QoS) requirements, maximize network throughput, etc. In some embodiments, TTIs having different TTI lengths may be carried in a common radio frame. In other embodiments, the wireless channel may partitioned into multiple bands each of which carrying (exclusively or otherwise) TTIs having a certain TTI length.

39 Claims, 10 Drawing Sheets

Related U.S. Application Data continuation of application No. 13/611,823, filed on Sep. 12, 2012, now Pat. No. 9,131,498.

(56) References Cited

U.S. PATENT DOCUMENTS

| | | |
|---|---|---|
| 2004/0228315 A1 | 11/2004 | Malkamaki |
| 2007/0047485 A1* | 3/2007 | Gorokhov ......... H04W 72/1231 370/329 |
| 2007/0245201 A1 | 10/2007 | Sammour et al. |
| 2008/0080465 A1* | 4/2008 | Pajukoski ............. H04L 1/0016 370/342 |
| 2008/0225802 A1 | 9/2008 | Sun et al. |
| 2008/0310385 A1 | 12/2008 | Iochi et al. |
| 2009/0034474 A1 | 2/2009 | Yavuz et al. |
| 2009/0103447 A1* | 4/2009 | Harada ................. H04L 1/1887 370/252 |
| 2009/0175245 A1 | 7/2009 | Harada et al. |
| 2009/0245186 A1* | 10/2009 | Klein ....................... H04L 1/16 370/329 |
| 2009/0245190 A1 | 10/2009 | Higuchi et al. |
| 2009/0258647 A1 | 10/2009 | Yamada et al. |
| 2009/0316811 A1 | 12/2009 | Maeda et al. |
| 2010/0046451 A1 | 2/2010 | Tada et al. |
| 2010/0098020 A1 | 4/2010 | Kim et al. |
| 2010/0226389 A1 | 9/2010 | Cho et al. |
| 2010/0303045 A1 | 12/2010 | Venkob et al. |
| 2010/0322229 A1 | 12/2010 | Kim et al. |
| 2011/0216730 A1 | 9/2011 | Kim et al. |
| 2012/0063294 A1 | 3/2012 | Osterling et al. |
| 2012/0135773 A1 | 5/2012 | Shen et al. |
| 2012/0230320 A1 | 9/2012 | Kishiyama et al. |
| 2012/0281646 A1* | 11/2012 | Liao .................... H04W 72/042 370/329 |
| 2013/0016655 A1* | 1/2013 | Heo ....................... H04L 5/001 370/328 |
| 2013/0142138 A1* | 6/2013 | Dinan ................... H04W 72/04 370/329 |
| 2013/0322277 A1 | 12/2013 | Vanganuru et al. |
| 2014/0016586 A1* | 1/2014 | Khan .................... H04L 1/0003 370/329 |
| 2014/0071954 A1* | 3/2014 | Au .................... H04W 72/0446 370/336 |

FOREIGN PATENT DOCUMENTS

| | | |
|---|---|---|
| CN | 101292456 A | 10/2008 |
| CN | 101572905 A | 11/2009 |
| CN | 101999247 A | 3/2011 |
| CN | 102523082 A | 6/2012 |
| EP | 1328087 A1 | 7/2003 |
| EP | 1898542 A1 | 3/2008 |
| EP | 2268075 A1 | 12/2010 |
| EP | 1938493 B1 | 10/2014 |
| WO | 2009035280 A2 | 3/2009 |
| WO | 2012113728 | 8/2012 |

OTHER PUBLICATIONS

NTT Docomo, Inc., "Variable TTI Length Control," 3GPP TSG RAN WG2 Ad Hoc on LTE, Draft: R2-061921, Jun. 27-30, 2006, Cannes, France, 3 pages.

Motorola, "System simulation results with non-static TTI", 3GPP TSG RAN1 LTE Ad Hoc, R1-061715, Jun. 2006, 8 Pages.

* cited by examiner

SYSTEM AND METHOD FOR ADAPTIVE TRANSMISSION TIME INTERVAL (TTI) STRUCTURE

This patent application is a continuation of U.S. Non-Provisional application Ser. No. 14/823,873, filed on Aug. 11, 2015 and entitled "System and Method for Adaptive Transmission Time Interval (TTI) Structure," which is a continuation of U.S. Non-Provisional application Ser. No. 13/611,823, filed on Sep. 12, 2012 (now U.S. Pat. No. 9,131,498 issued Sep. 8, 2015) and entitled "System and Method for Adaptive Transmission Time Interval (TTI) Structure," all of which applications are hereby incorporated herein by reference as if reproduced in their entirety.

TECHNICAL FIELD

The present invention relates generally to wireless communications, and more specifically, to a system and method for adapting the length of transmission time intervals (TTIs).

BACKGROUND

Modern wireless networks must support the communication of diverse traffic types (e.g., voice, data, etc.) having different latency requirements, while at the same time satisfying overall network/channel throughput requirements. The ability to satisfy these latency and throughput requirements is affected by, inter alia, wireless channel conditions and wireless channel parameters. One wireless channel parameter that significantly affects both latency and throughput performance is the size (or length) of the transport containers used to carry the traffic. Conventional networks use a single, fixed-length, transport container, and are therefore limited in their ability to adapt to changes in wireless channel conditions, usage, etc.

SUMMARY OF THE INVENTION

Technical advantages are generally achieved by embodiments of the present invention which adapt the length of downlink transmission time intervals (TTIs) in downlink radio frames to satisfy latency and/or throughput performance.

In accordance with an embodiment, a method of communicating data in a wireless channel is provided. In this example, the method comprises receiving a first data and a second data. The method further includes transporting the first data in transmission time intervals (TTIs) of the wireless channel having a first TTI length; and transporting the second data in TTIs of the wireless channel having a second TTI length that is different than the first TTI length. A transmitting device for performing this method is also provided. A device for receiving data transmitted in accordance with this method is also provided.

In accordance with another embodiment, another method for communicating data in a wireless channel is provided. In this example, the method includes receiving a first data destined for a receiving device, selecting a first TTI length for transporting the first data, and transmitting the first data in a first TTI of the wireless channel having the first TTI length. The method further includes receiving a second data destined for the receiving device, selecting a second TTI length for transporting the second data, and transmitting the second data in a second TTI of the wireless channel having the second TTI length. A transmitting device for performing this method is also provided. A device for receiving data transmitted in accordance with this method is also provided.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Conventional wireless networks use fixed length transport containers. For instance, networks operating under the third generation partnership (3GGP) long term evolution (LTE) release eight (rel-8) telecommunication standards use one millisecond (ms) transmission time intervals (TTIs). The length of a transport container can significantly affect latency performance and throughput performance of the network. Specifically, shorter transport containers achieve superior latency performance by providing more frequent transmission opportunities, while longer transport containers achieve superior throughput performance by reducing signaling overhead. Hence, fixed length transport containers may be unable to satisfy latency requirements and/or provide desired throughput performance under some network conditions. As such, mechanisms or techniques for varying transport container length are desired in order to achieve improved network performance.

Aspects of this disclosure provide mechanisms for adapting the length of transport containers in accordance with various parameters (e.g., latency requirements, buffer size, user mobility characteristics, etc.). Although much of this disclosure is presented in the context of LTE (e.g., transport containers may be referred to as TTIs, etc.), the techniques and/or mechanisms discussed herein can be applied to non-LTE networks (e.g., any frequency division duplex and/or time division duplex communication systems). Although much of this disclosure are discussed in the context of downlink communications, the principles described herein can also be applied to provide adaptive TTI structures in uplink communications, as well as other forms of wireless communications (e.g., device-to-device, etc.).

Figure 1:
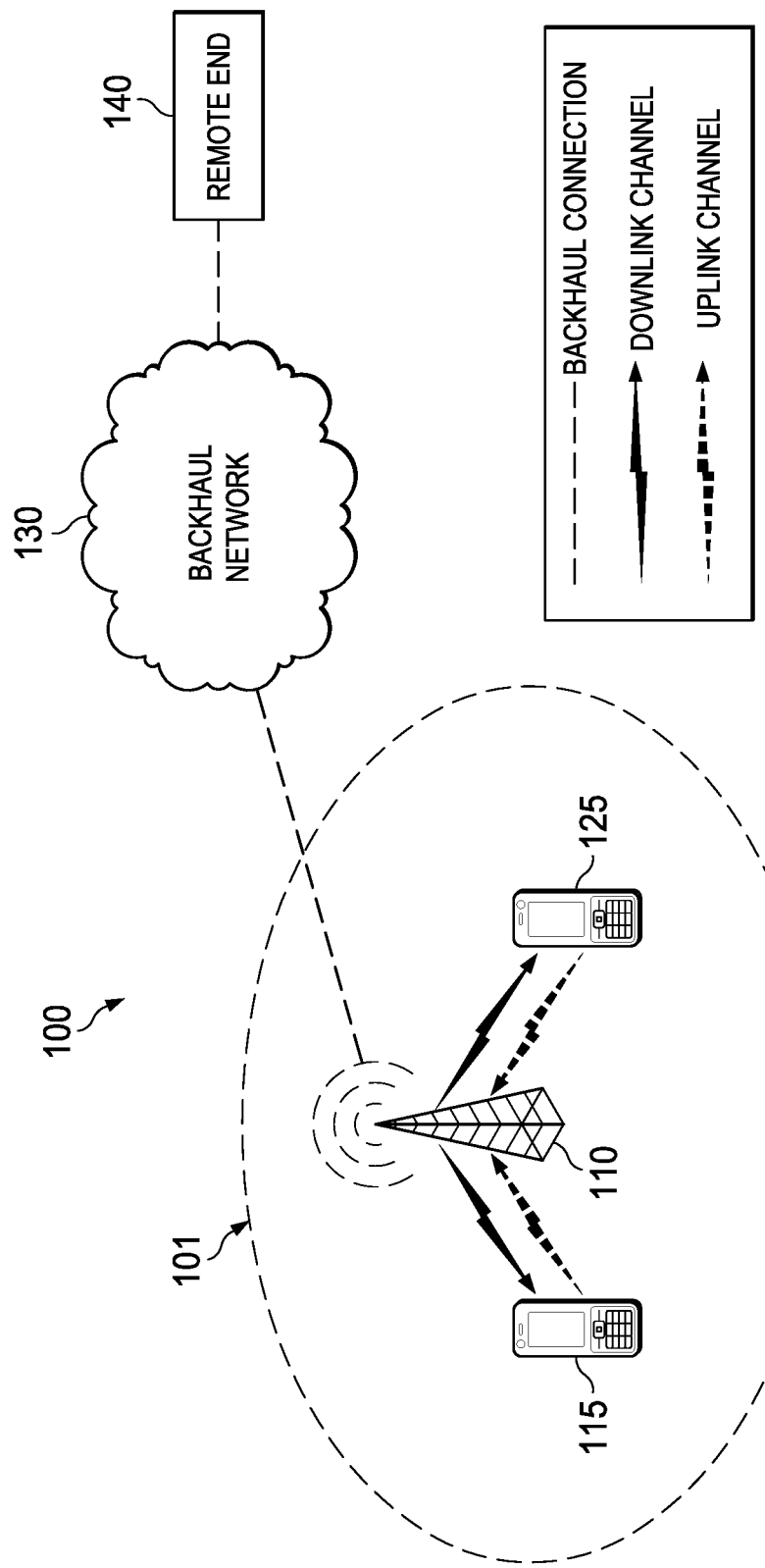
FIG. 1 illustrates a diagram of an embodiment of a wireless communications network.

FIG. 1 illustrates a wireless network 100 comprising a cellular coverage area 101 within which an eNB no provides wireless access to a plurality of UEs 115, 125. The eNB 110 may provide wireless access by establishing a downlink communication channel (solid arrows) and an uplink communication channel (dotted arrows) with the UEs 115,125. In an embodiment, the wireless network 100 may operate in accordance with an LTE communication protocol. The downlink communication channel may carry data channels (e.g., physical downlink shared channel (PDSCH), etc.) and control channels (e.g., a physical downlink shared channels (PDCCH), etc.). More specifically, the control channels may include UE/group specific control channels and common control channels that carry downlink control information to the UEs (and/or relays), as well as uplink (UL)-related control channels that carry various uplink control information to the UEs (e.g., hybrid automatic repeat request (HARQ), acknowledge/negative-acknowledge (ACK/NACK), UL grant etc.).

Figure 2:
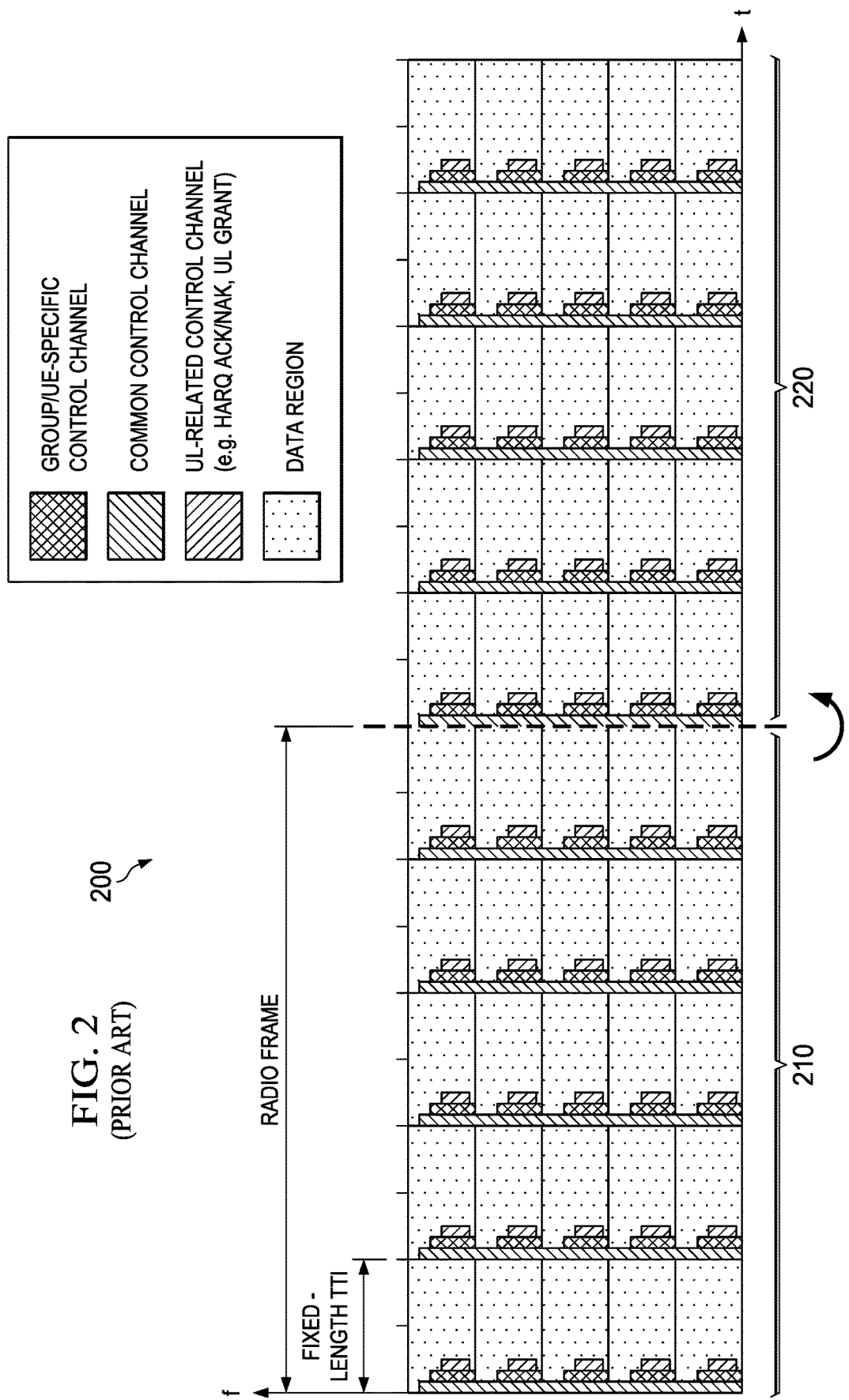
FIG. 2 illustrates a diagram of a prior art downlink channel carrying fixed-length TTIs.

FIG. 2 illustrates a prior art DL channel 200 carrying a plurality of radio frames 210-220. As shown, TTIs in the radio frames 210-220 are fixed length, with each TTI carrying a common control channel, a group/UE-specific control channel, and UL-related control channels.

Figure 3:
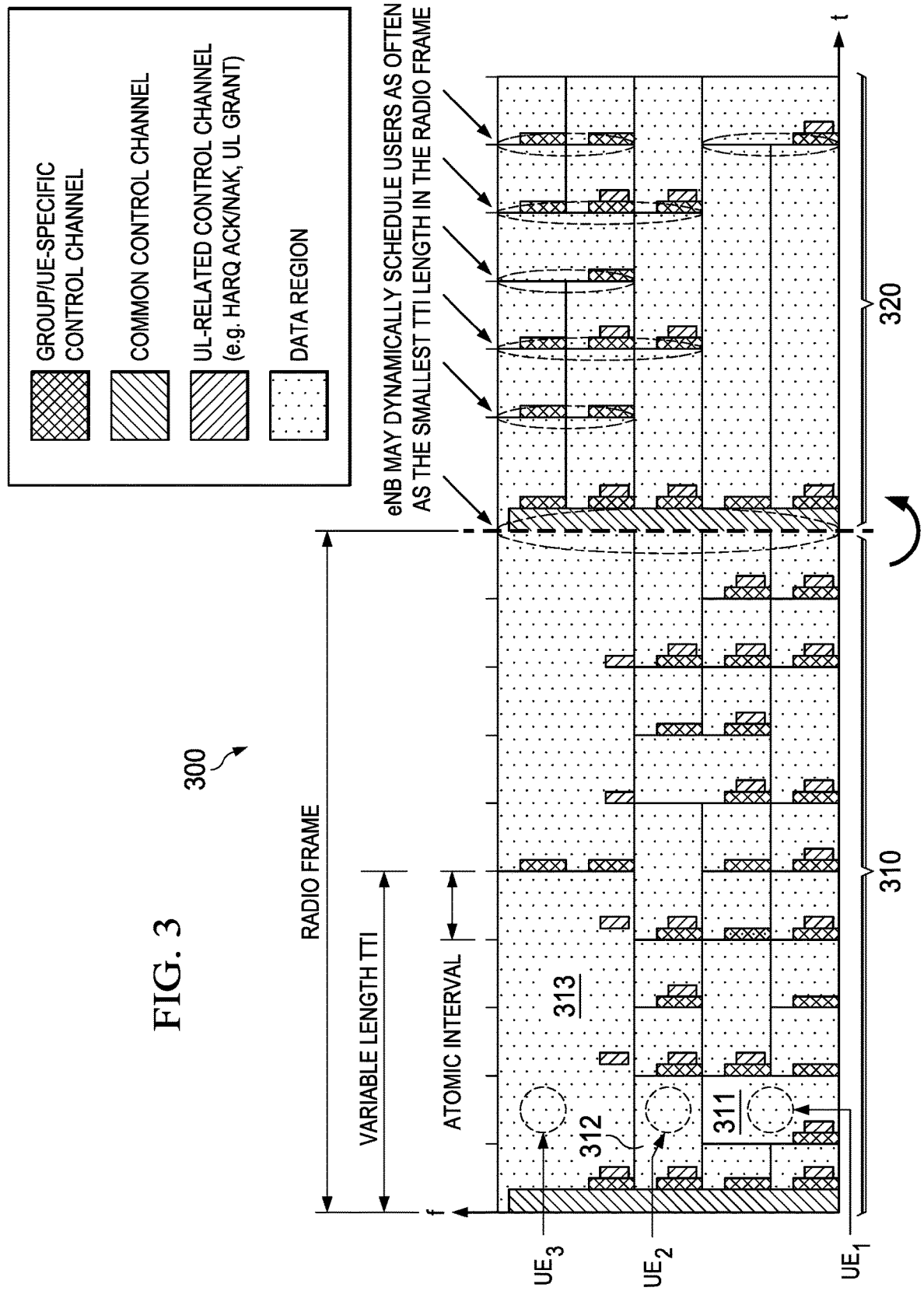
FIG. 3 illustrates a diagram of an embodiment of a downlink channel carrying variable-length TTIs.

FIG. 3 illustrates an embodiment of a DL channel 300 carrying a plurality of radio frames 310-320. Unlike the prior art DL channel 200, the DL channel 300 carries variable-length TTIs. The periodicity of the common control channel is determined by the periodicity of the radio frames (e.g., one common control channel per radio-frame). The periodicity of the group/UE-specific control channel is determined by the periodicity of variable-length TTIs (e.g., one group/UE-specific control channel per TTI). Notably, including a group/UE-specific control channel in each TTI allows the eNB to dynamically schedule UEs to TTIs as often as the smallest length-TTI (i.e., as often as the atomic interval). Further, the UL-related control channel is decoupled from the TTI structure, such that the periodicity of the UL-related control channel is independent from the length/periodicity of the variable-length TTIs. For instance, the TTI 311 carries one UL-related control channel, while the TTI 313 carries three UL-related control channels. Notably, some TTIs do not carry any UL-related control channels. Hence, the amount of control overhead in the DL channel 300 is variable, and depends on the periodicity of the UL-related control channel (e.g., as configured by the network administrator) as well as the periodicity of the group/UE specific control channel (e.g., as determined by the TTI-length configurations of the radio frames 310-320).

Figure 4:
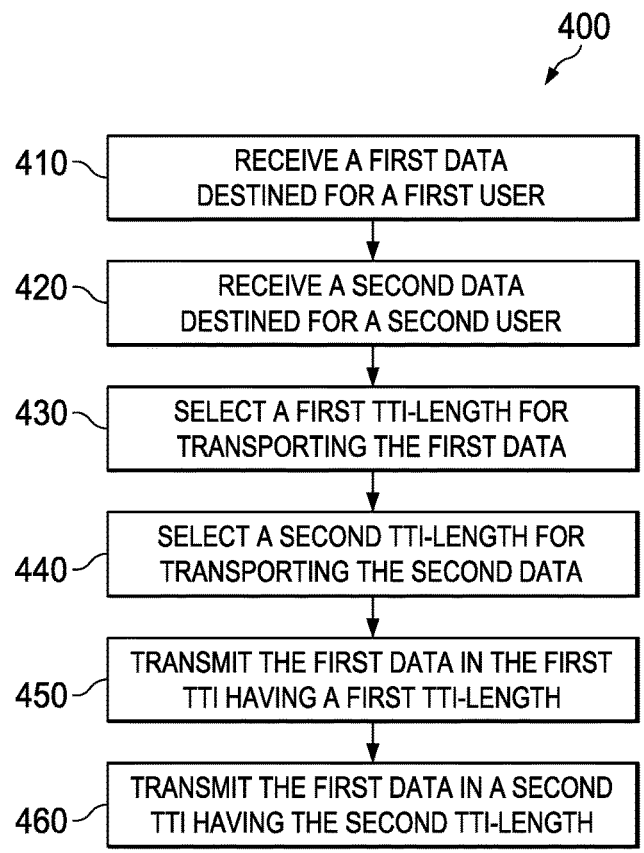
FIG. 4 illustrates a flowchart of an embodiment method for adapting TTI-lengths in a DL channel.

FIG. 4 illustrates a flowchart of a method 400 for adapting TTI-lengths in a DL channel. The method 400 begins at step 410, where the eNB receives a first data destined for a first user. Thereafter, the method 400 proceeds to step 420, where the eNB receives a second data destined for a second user. The first data and the second data may be buffered in separate buffers of the eNB. Thereafter, the method 400 proceeds to step 430, where the eNB selects a first TTI-length for transporting the first data. This selection may be made in accordance with various selection criteria, including latency requirements, buffer size, mobility characteristics of the first user, etc. Thereafter, the method 400 proceeds to step 440, where the eNB selects a second TTI-length for transporting the second data. Next, the method 400 proceeds to step 450, where the eNB transmits the first data in a first TTI having the first TTI-length. Next, the method 400 proceeds to step 460, where the eNB transmits the second data in a second TTI having the second TTI-length. The first data and the second data may be transmitted in a common radio-frame.

Figure 5:
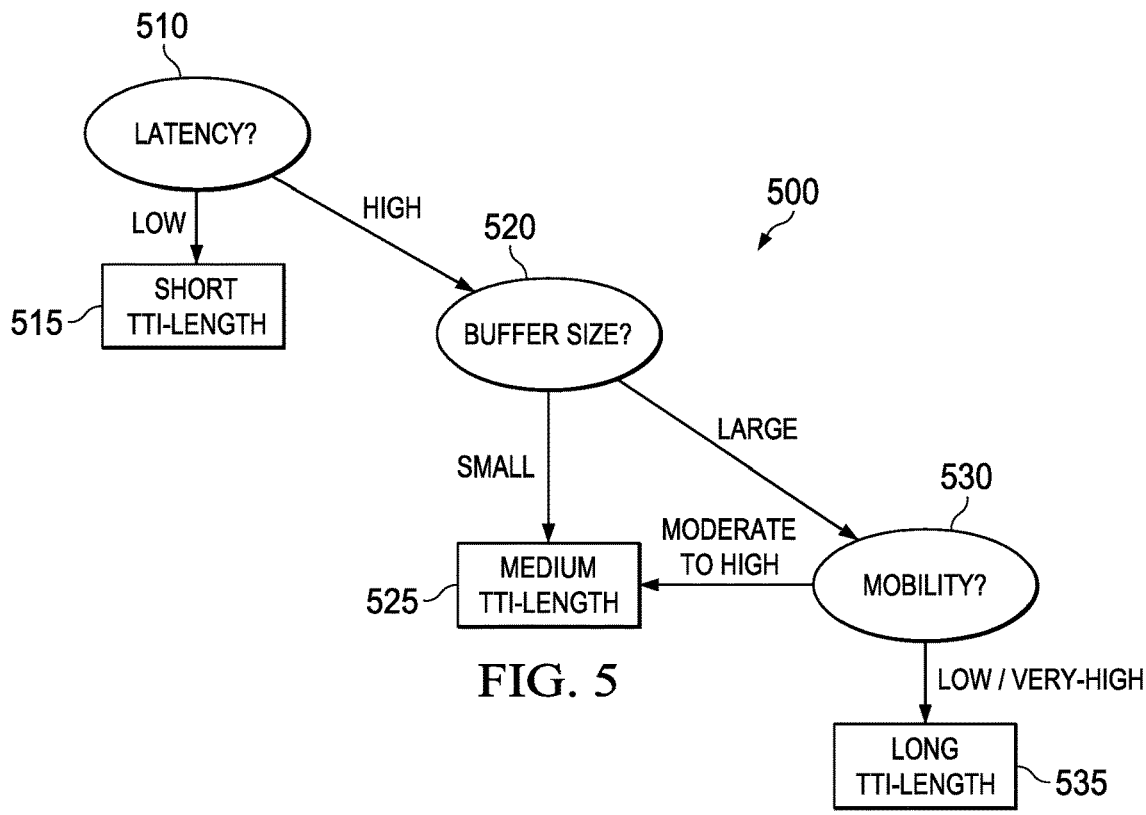
FIG. 5 illustrates a diagram of an embodiment for selecting TTI-lengths for transporting data in a DL channel.

FIG. 5 illustrates a flowchart of a method 500 for selecting TTI-lengths for transporting data in a DL channel. Notably, the method 500 represents just one example for selecting TTI-lengths. Other examples that consider other factors and/or have more TTI-length designations may also be used to select TTI-lengths for data transmission. The method 500 begins at step 510, where the eNB determines whether the latency requirement of the data (e.g., whether the data requires low latency), which may be determined in accordance with the traffic type of the data. For instance, some traffic types (e.g., voice, mobile gaming, etc.) may require low levels of latency, while other traffic types (e.g., messaging, email, etc.) may have less stringent latency requirements.

If the data requires low latency, then a short TTI-length 515 is selected to transport the data. If the data has a higher (i.e., less stringent) latency requirement, then the method 500 proceeds to step 520, where the eNB determines the buffer size used to store the data. Specifically, the buffer size of the data is indicative of the amount of data that needs to be transported. When large amounts of data need to be transported, then longer TTI-lengths may provide higher throughput rates by minimizing overhead. However, large TTI-lengths may not be warranted when only small amounts of data need to be transported. For instance, if there is not enough data to fill the long TTI, then a medium TTI-length may be more efficient. If the data has a small buffer size, then a medium TTI-length 525 is selected. Otherwise, if the data has a large buffer size, then the method 500 proceeds to step 530.

At step 530, the eNB determines whether the user has a low, medium, high or very-high mobility characteristic. A user's mobility characteristic may correspond to a rate at which the user is moving. For instance, users that are moving at a higher rates of speed (e.g., a user communicating in a car) have higher mobility characteristics than users moving at comparatively lower rates of speed (e.g., a user walking through a park). Notably, a user's mobility characteristic is highly correlated to wireless channel stability, as highly mobile users experience more volatile channel conditions than less mobile users. Moreover, wireless channel stability heavily influences the degree to which link adaptation can be improved through more frequent channel estimation opportunities. That is, users having moderate to high mobility characteristics may achieve improved bit-rates when using medium TTI-lengths (or even short TTI-lengths) due to enhanced link adaptation resulting from more frequent channel estimation opportunities. These higher bitrates may outweigh the overhead savings of long TTI-lengths, and consequently may increase overall throughput for those users. However, fast link adaptation capabilities may be less beneficial for stationary or slow moving users, as those users experience relatively stable channel conditions. As a result, low mobility users may derive higher throughput by exploiting the low-overhead nature of long TTI-lengths, rather than the faster link adaptation capabilities derived from medium or low TTI-lengths. In addition, users that have very high mobility characteristics (e.g., users moving at very-high rates of speed) may derive little or no gain from link adaptation, as channel conditions may be changing too quickly to perform channel estimation with sufficient accuracy to improve the bit-rate. Hence, very-high mobility users may achieve higher throughput from long TTI-lengths. Referring once again to the method 500, if the data is destined for a user having moderate to high mobility, then the eNB selects a medium TTI-length for transporting the data (at step 530). Alternatively, if the user has either low or very-high mobility, then the eNB selects a medium TTI-length for transporting the data (at step 530). Notably, degrees of mobility (low, medium, high, and very high) may be relative to the network conditions and/or capabilities of the wireless communication devices.

Figure 6:
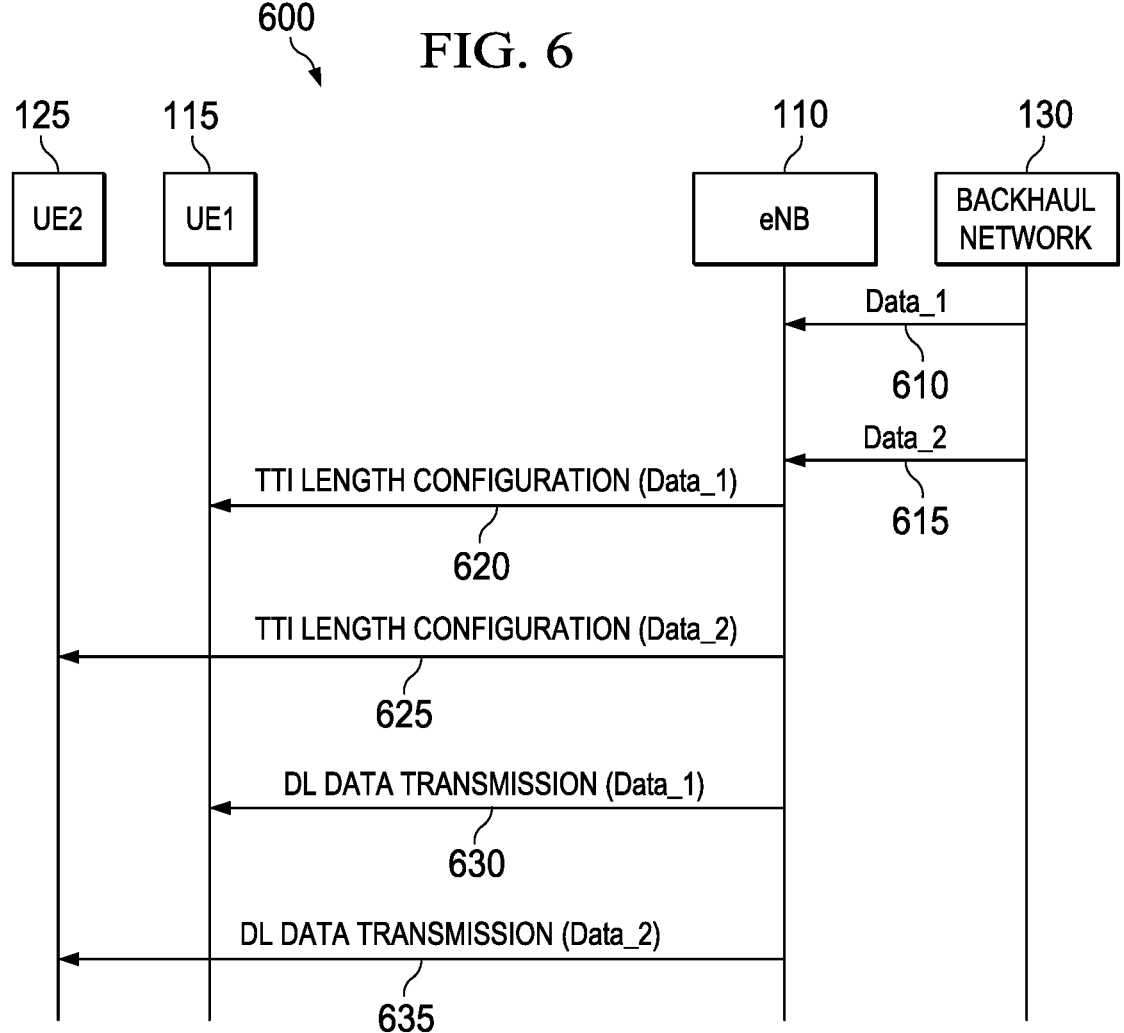
FIG. 6 illustrates a protocol diagram of an embodiment communication sequence for adapting TTI-lengths in a DL channel.

FIG. 6 illustrates a protocol diagram for a communications sequence 600 for communicating data in TTIs having varying TTI-lengths. The communications sequence 600 begins when a first data (Data_1) 610 and a second data (Data_1) 615 destined for the UE1 115 and UE 125 (respectively) are communicated from the backhaul network 130 to the eNB 110. Upon reception, the eNB 110 determines which TTI-length to transport the Data_1 610 and the Data_1 615. The eNB 110 communicates the TTI-lengths by sending a TTI length configuration (Data_1) message 620 and a TTI length configuration (Data_2) message 625 to the UEs 115 and 125 (respectively). Thereafter, the eNB 110 communicates the Data_11 610 and the Data_2 620 via the DL data transmission (Data_1) 630 and the DL data transmission (Data_2) 635. In an embodiment, the DL data transmission (Data_1) 63o and the DL data transmission (Data_2) 635 may be carried in different length TTIs of a common radio-frame.

Figure 7:
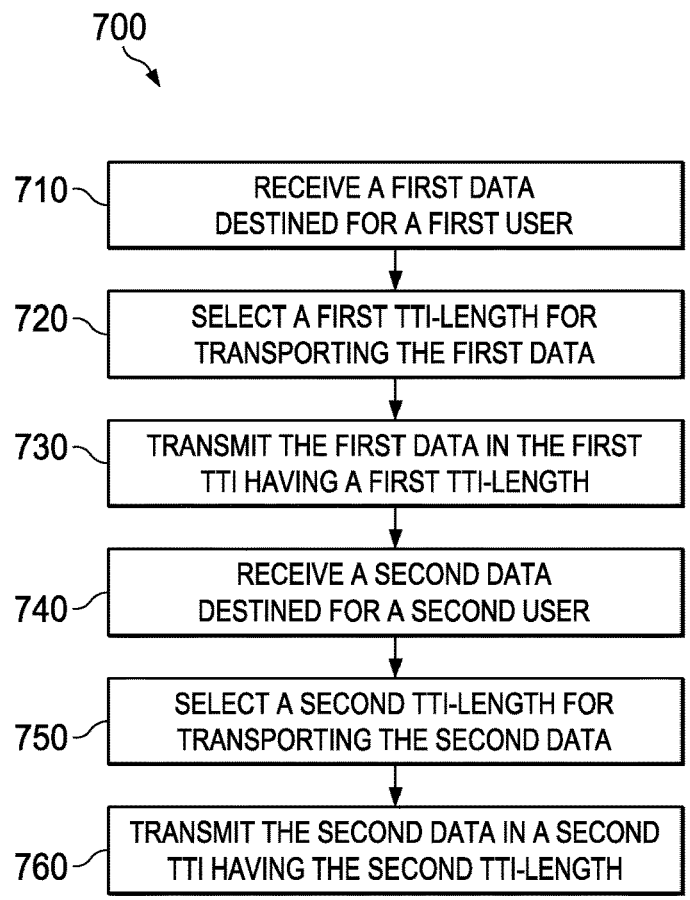
FIG. 7 illustrates a flowchart of another embodiment method for adapting TTI-lengths in a DL channel.

FIG. 7 illustrates a flowchart of a method 700 for adapting TTI-lengths in a DL channel. The method 700 begins at step 710, where the eNB receives a first data destined for a user. Thereafter, the method 700 proceeds to step 720, where the eNB selects a first TTI-length for transporting the first data. Thereafter, the method 700 proceeds to step 730, where the eNB transmits the first data in a first TTI having the first TTI-length. Next, the method 700 proceeds to step 740, where the eNB receives a second data destined for the same user. Thereafter, the method 700 proceeds to step 750, where the eNB selects a second TTI-length for transporting the second data. The second TTI-length may be different than the first TTI-length for various reasons. For instance, the first data and the second data may have different latency requirements and/or buffer sizes, and/or then user's mobility characteristics may have changed. Next, the method 700 proceeds to step 760, where the eNB transmits the second data in a second TTI having the second TTI-length.

Figure 8:
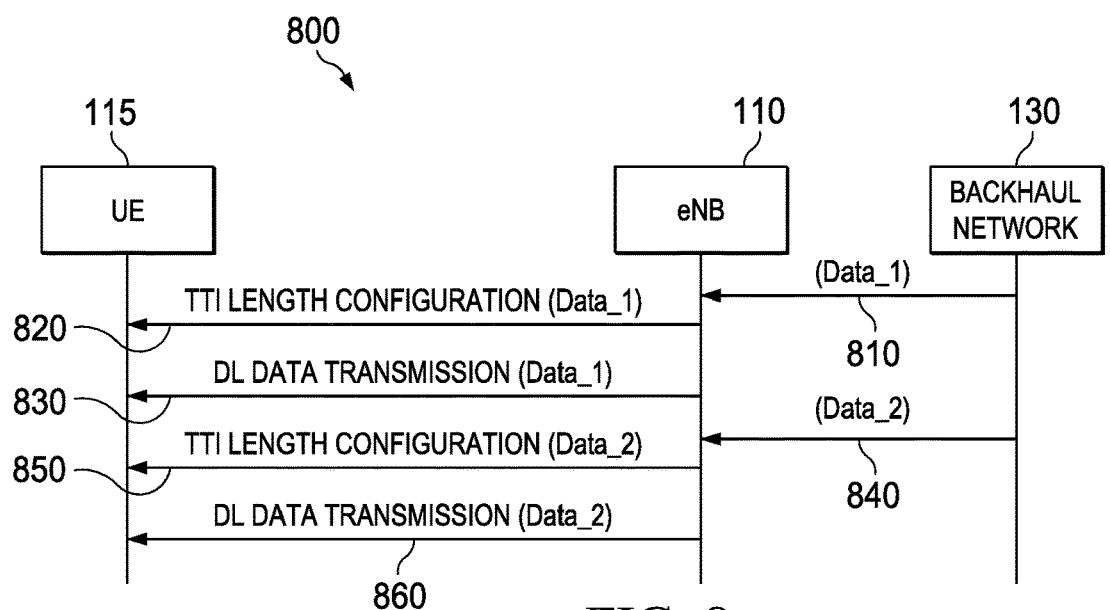
FIG. 8 illustrates a protocol diagram of another embodiment communication sequence for adapting TTI-lengths in a DL channel.

FIG. 8 illustrates a protocol diagram for a communications sequence 800 for adapting the TTI-lengths used for carrying data to a common user. The communications sequence 800 begins when a Data_1 810 destined for a UE 115 is communicated from the backhaul network 130 to the eNB 110. Upon reception, the eNB 110 selects a TTI-length for transporting the Data_1 810, which the eNB 110 communicates to the UE 110 via the TTI length configuration (Data_1) message 820. Thereafter, the eNB 110 communicates the Data_1 810 in the DL data transmission (Data_1) 830. Thereafter, a Data_2 840 destined for a UE 115 is communicated from the backhaul network 130 to the eNB 110. Upon reception, the eNB 110 selects a TTI-length for transporting the Data_2 840, which the eNB 110 communicates to the UE 110 via the TTI length configuration (Data_2) message 850. Thereafter, the eNB 110 communicates the Data_2 840 in the DL data transmission (Data_2) 860. In an embodiment, the DL data transmission (Data_1) 830 and DL data transmission (Data_2) 860 may be carried in the TTIs having different TTI lengths. The DL data transmission (Data_1) 830 and DL data transmission (Data_2) 860 may be communicated in the same, or different, radio frames.

In some embodiments, the TTI structure of radio frames may be adapted dynamically, such the TTI length configuration messages/indications are included in the Group/UE-specific control channel of each TTI. On one hand, dynamically adapting the TTI structure of radio frames with such granularity may provide high degrees of flexibility with respect to TTI-length adaptation. On the other hand, the inclusion of additional control signaling in the UE/group specific control channel may significantly increase overhead in the radio frame, as the UE/group specific control channel is communicated relatively frequently (e.g., in each TTI). To reduce the overhead attributable to TTI-length adaptation, the TTI structure of radio frame may be adapted in a semi-static manner.

Figure 9:
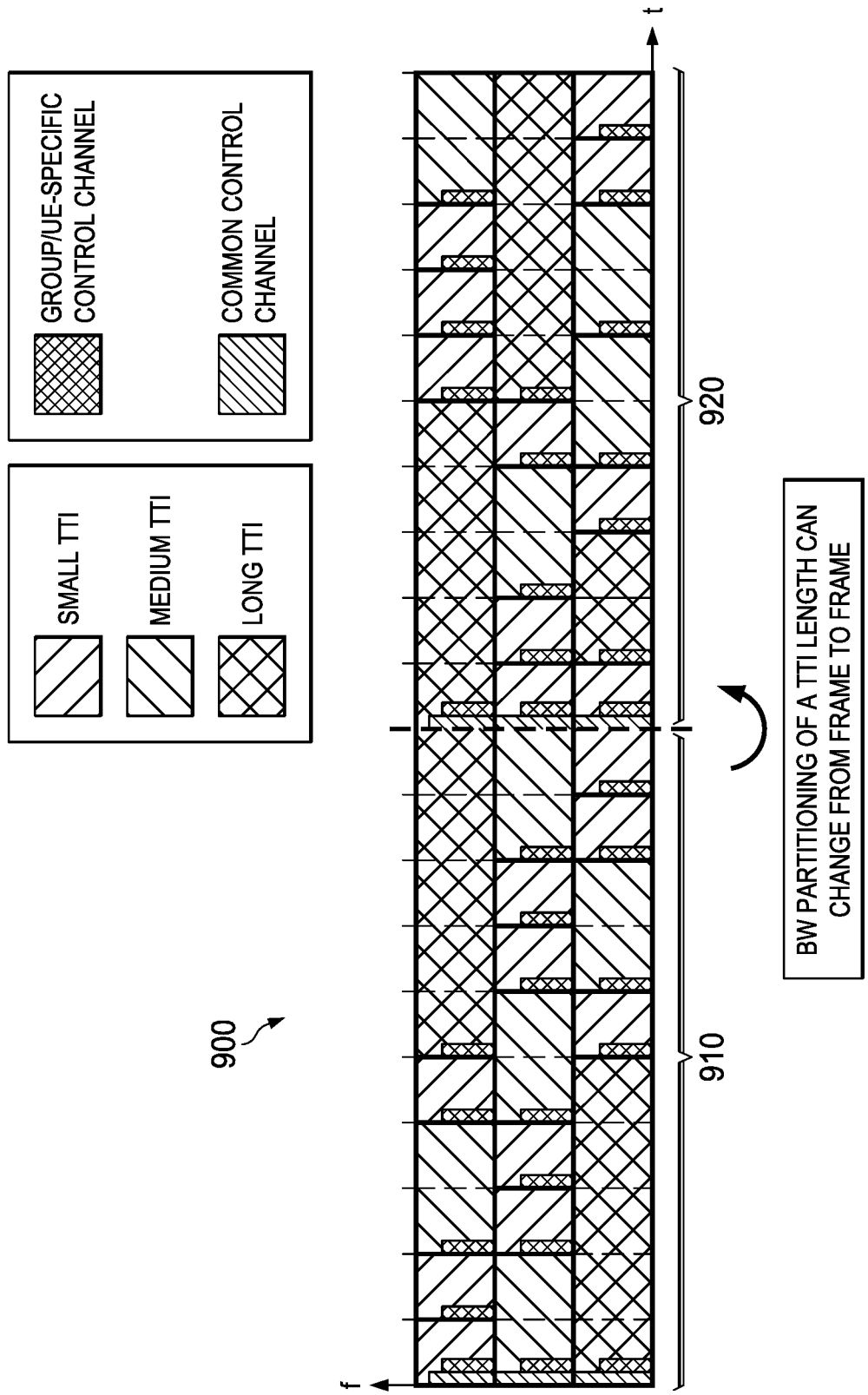
FIG. 9 illustrates a diagram of another embodiment of a DL channel carrying variable-length TTIs.

FIG. 9 illustrates an embodiment of a DL channel 900 carrying a plurality of variable-length TTIs in a plurality of radio frames 910-920. The DL channel 900 may be somewhat similar to the DL channel 300, with the exception that the DL channel 900 carries the TTI length configuration messages/indications in the common control channel, rather than the UE-Group specific control channels. This may reduce the overhead attributable to TTI-length adaptation when high-frequency adaptation is unnecessary. Furthermore, different TTI-lengths may occupy different portions of the DL channel 900 through bandwidth partitioning. Such bandwidth partitioning may depend on the amount of UEs configured for a particular TTI length. For example, if there are twice the amount of UEs configured for the short TTI-length than the medium TTI-length, the bandwidth occupied by the short TTI-length may be twice the amount of bandwidth occupied by the medium-TTI length. An advantage of this semi-static arrangement is that the UEs know the TTI location in time and bandwidth partitioning by virtue of the aforementioned configuration messages/indications, and consequently the UEs only need to look for its UE/Group specific control channels in the time-frequency regions corresponding to the particular TTI-length. Hence, rather than having to search for the entire bandwidth and every atomic interval for its UE/Group specific control channels, this arrangement reduces the control channel decoding complexity of a UE.

Figure 10:
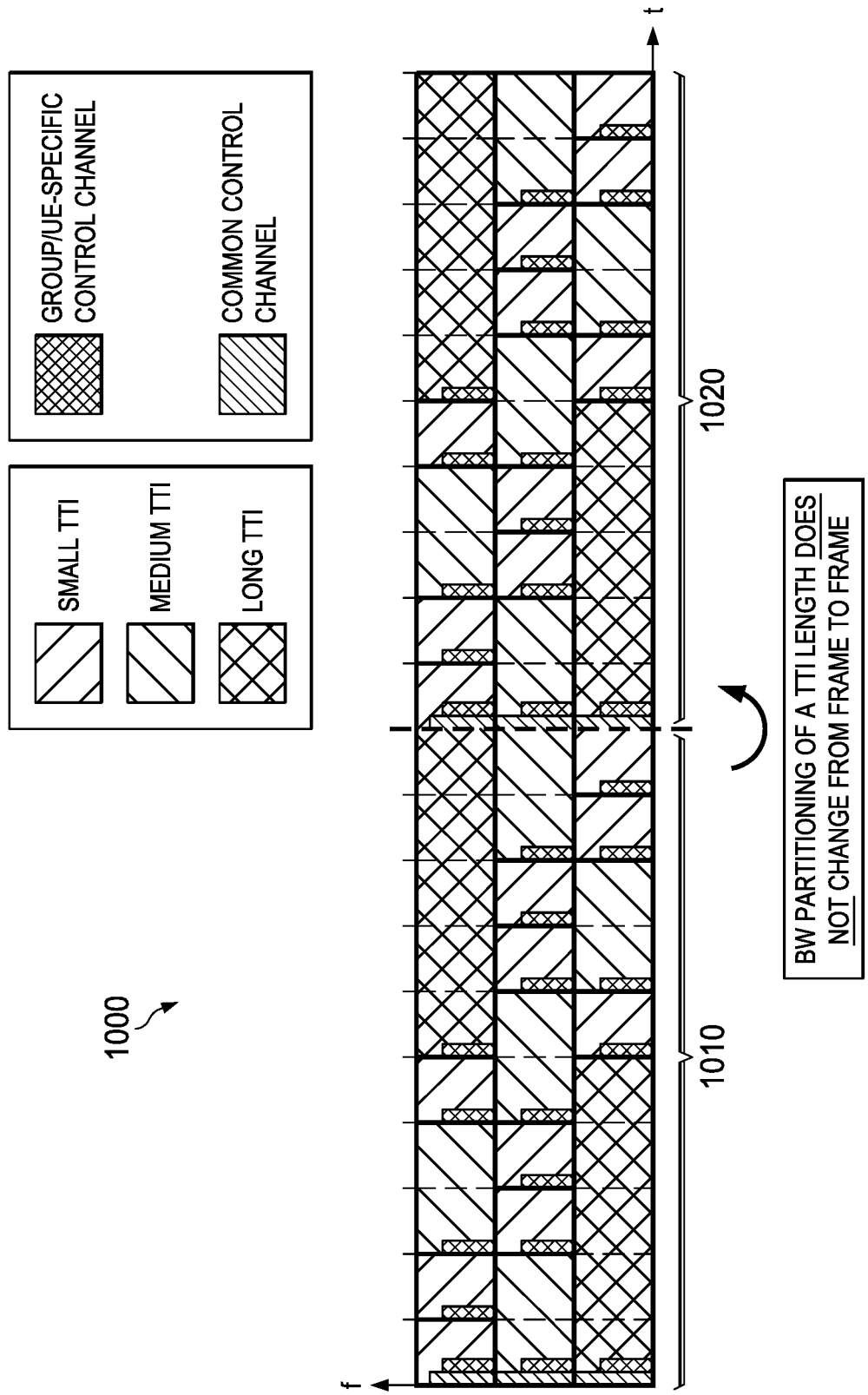
FIG. 10 illustrates a diagram of an embodiment of a DL channel carrying TTIs have various lengths.
Figure 11:
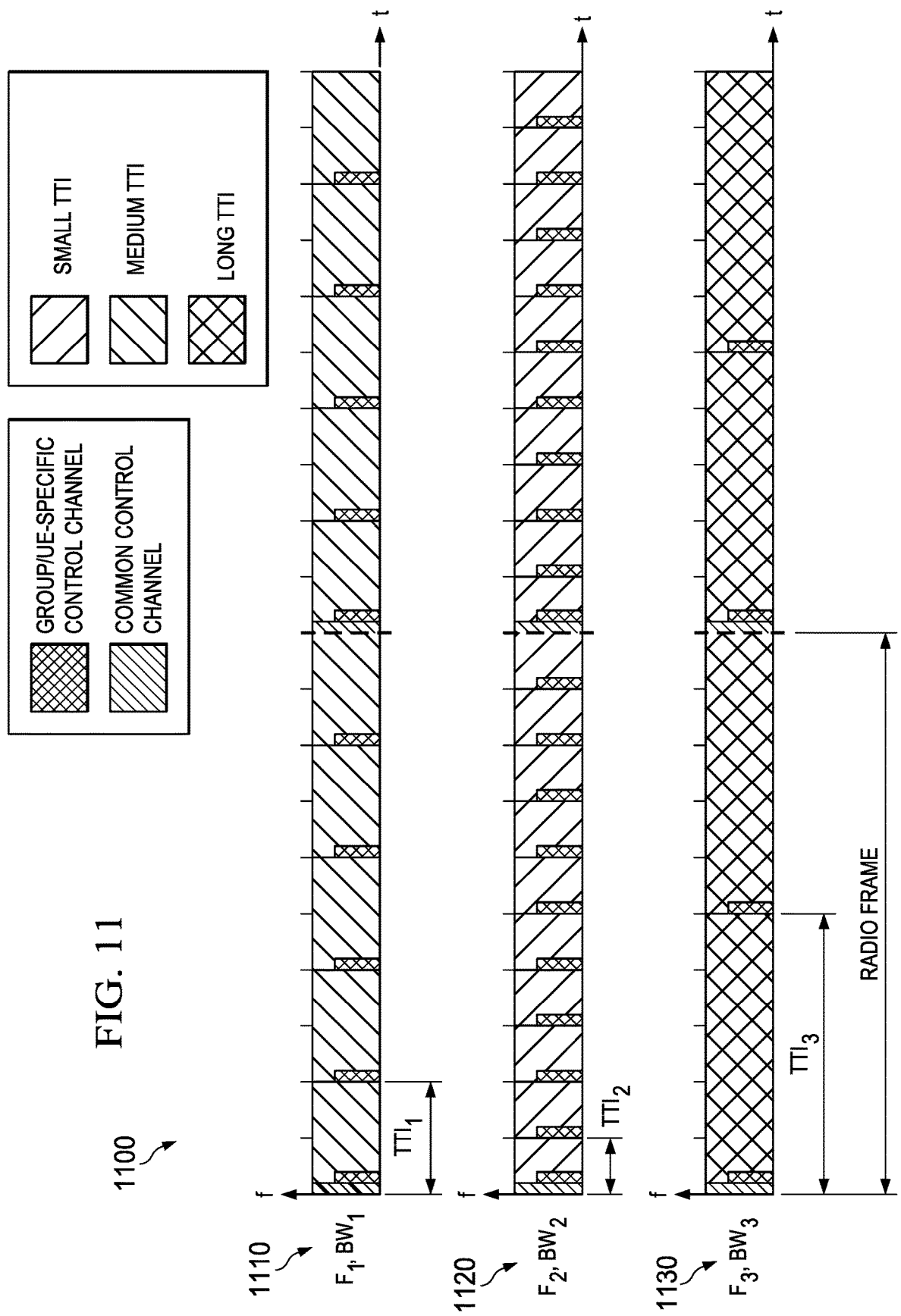
FIG. 11 illustrates a diagram of an embodiment of a DL channel carrying TTIs have various lengths.

A further alternative for reducing overhead is to perform TTI-length adaptation in radio frames that have a static TTI structure. In this context, radio frames having a static structure comprise a variety of TTI-lengths with which to schedule users, but the ratio and placement of TTIs is fixed such that TTI-length does not change from one radio frame to another. FIG. 10 illustrates a downlink channel 1000 for communicating radio frames 1010-1020 having a static TTI structure. Notably, the radio frame 1010 and 1020 have identical TTI structures such that the placement/ratio of the short, medium, and long TTIs does not change from one radio frame to another. Hence, TTI-length adaptation is accomplished in the downlink channel 1000 through selective scheduling (e.g., scheduling users to different TTI-lengths), rather than by adapting the TTI structure of the radio frames 1010-1020. Similarly, TTI-length adaptation can be achieved via carrier aggregation. FIG. 11 illustrates a downlink channel 1000 for achieving TTI-length adaptation via carrier aggregation. As shown, mid-length TTIs are carried in the frequency band 1110, short-length TTIs are carried in the frequency band 1120, and long-length TTIs are carried in the frequency band 1130. Like the fixed-frame structure of the downlink channel 1000, TTI-length adaptation is accomplished in the downlink channel 1100 through selective scheduling (e.g., scheduling users to different TTI-lengths).

Figure 12:
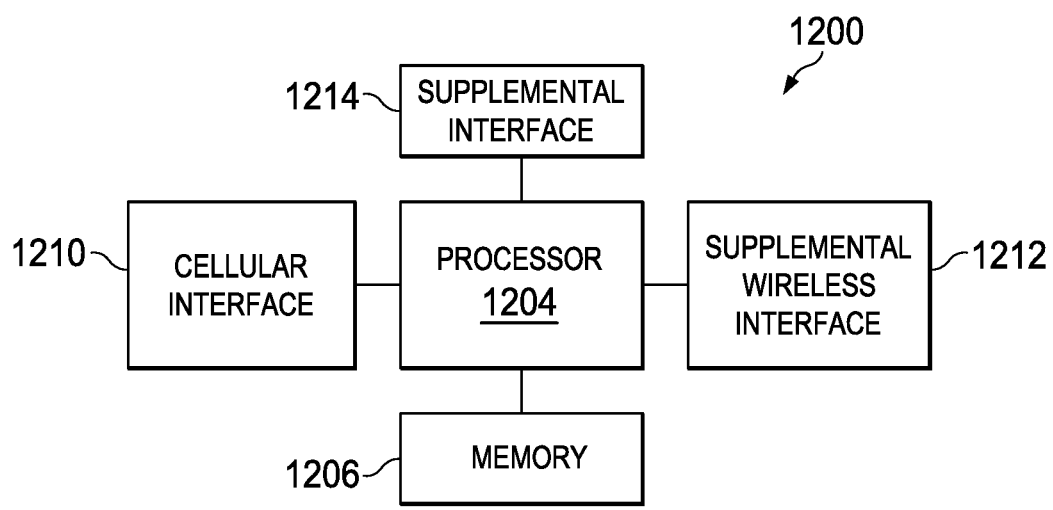
FIG. 12 illustrates a block diagram of an embodiment of a communications device.

FIG. 12 illustrates a block diagram of an embodiment of a communications device 1200, which may be implemented as one or more devices (e.g., UEs, eNBs, etc.) discussed above. The communications device 1200 may include a processor 1204, a memory 1206, a cellular interface 1210, a supplemental wireless interface 1212, and a supplemental interface 1214, which may (or may not) be arranged as shown in FIG. 12. The processor 1204 may be any component capable of performing computations and/or other processing related tasks, and the memory 1206 may be any component (volatile, non-volatile, or otherwise) capable of storing programming and/or instructions for the processor 1204. In embodiments, the memory 1206 is non-transitory. The cellular interface 1210 may be any component or collection of components that allows the communications device 1200 to communicate using a cellular signal, and may be used to receive and/or transmit information over a cellular connection of a cellular network. The supplemental wireless interface 1212 may be any component or collection of components that allows the communications device 1200 to communicate via a non-cellular wireless protocol, such as a Wi-Fi or Bluetooth protocol, or a control protocol. The supplemental interface 1214 may be any component or collection of components that allows the communications device 1200 to communicate via a supplemental protocol, including wire-line protocols.

In accordance with an embodiment, a method of communicating data in a wireless channel is provided. In this example, the method comprises receiving, by an access point (AP), at least a first data and a second data from a network, and transmitting, by the AP, the first data in a first transmission time interval (TTI) and the second data in a second TTI of a downlink channel in accordance with a TTI configuration. The first TTI and the second TTI have different TTI lengths based on the TTI configuration. The first TTI and the second TTI have different fixed TTI lengths based on the TTI configuration. The TTI lengths of the first TTI and the second TTI are determined based on characteristics of the first data and the second data, respectively, according to the TTI configuration. The TTI lengths of the first TTI and the second TTI are determined based on a buffer size associated with the first data and the second data, respectively, or based on a latency requirement of the first data and the second data, respectively.

The first data is transmitted to a first user equipment (UE) and the second data is transmitted to a second UE, or the first data and second data are transmitted to the first UE; the TTI lengths of the first TTI and the second TTI are determined based on characteristics of the first UE and the second UE, respectively, according to the TTI configuration. The TTI lengths of the first TTI and the second TTI are determined based on mobility characteristics of the first UE and the second UE, respectively, according to the TTI configuration.

In accordance with an embodiment, an access point (AP) is provided. In this example, the AP comprises a processor and a non-transitory computer readable storage medium storing programming for execution by the processor. The programming includes instructions to receive at least a first data and a second data from a network, and to transmit the first data in a first transmission time interval (TTI) and the second data in a second TTI of a downlink channel in accordance with a TTI configuration. The first TTI and the second TTI have different TTI lengths based on the TTI configuration. The first TTI and the second TTI have different fixed TTI lengths based on the TTI configuration. The TTI lengths of the first TTI and the second TTI are determined based on characteristics of the first data and the second data, respectively, according to the TTI configuration. The TTI lengths of the first TTI and the second TTI are determined based on a latency requirement of the first data and the second data, respectively. The TTI lengths of the first TTI and the second TTI are determined based on a buffer size associated with the first data and the second data, respectively.

The first data is transmitted to a first user equipment (UE) and the second data is transmitted to a second UE, or the first data and second data are transmitted to the first UE; the TTI lengths of the first TTI and the second TTI are determined based on characteristics of the first UE and the second UE, respectively, according to the TTI configuration. The TTI lengths of the first TTI and the second TTI are dynamically determined based on mobility characteristics of the first UE and the second UE, respectively, according to the TTI configuration.

In accordance with an embodiment, a method of communicating data in a wireless channel is provided. In this example, the method comprises receiving, by an access point (AP), at least a first data from a network, and transmitting, by the AP, the at least the first data in a first transmission time interval (TTI) of a downlink channel. The downlink channel has at least a first radio frame, and the first radio frame comprises at least the first TTI and a second TTI communicated in a common data channel according to a TTI configuration. The first TTI and the second TTI have different TTI lengths based on the TTI configuration.

The first TTI and the second TTI have different fixed TTI lengths based on the TTI configuration. The TTI lengths of the first TTI and the second TTI are determined based on characteristics of data carried by the first TTI and the second TTI, respectively, according to the TTI configuration. The TTI lengths of the first TTI and the second TTI are determined based on a buffer size associated with data carried by the first TTI and the second TTI, respectively. The TTI lengths of the first TTI and the second TTI are determined based on a latency requirement of data carried by the first TTI and the second TTI, respectively.

The TTI lengths of the first TTI and the second TTI are determined based on a mobility characteristic of user equipments (UEs) receiving data carried by the first TTI and the second TTI, respectively.

In accordance with an embodiment, an access point (AP) is provided. In this example, the AP comprises a processor and a non-transitory computer readable storage medium storing programming for execution by the processor. The programming includes instructions to receive at least a first data from a network, and to transmit the at least the first data in a first transmission time interval (TTI) of a downlink channel. The downlink channel has at least a first radio frame, and the first radio frame comprises at least the first TTI and a second TTI communicated in a common data channel according to a TTI configuration. The first TTI and the second TTI have different TTI lengths based on the TTI configuration.

In accordance with embodiments, a transmitting device receives a first plurality of data. The transmitting device receives a second plurality of data. The transmitting device transmits the first plurality of data in a first plurality of transmission time intervals (TTIs) of the wireless channel. The first plurality of TTIs have a first TTI length. The transmitting device transmits the second plurality of data in a second plurality of TTIs of the wireless channel. The second plurality of TTIs have a second TTI length that is different than the first TTI length.

Optionally, the transmitting device determines the first TTI length in accordance with a first latency requirement of the first plurality of data. The transmitting device determines the second TTI length in accordance with a second latency requirement of the second plurality of data. The first latency requirement is different than the second latency requirement.

Optionally, the transmitting device determines the first TTI length in accordance with a first buffer size associated with the first plurality of data. The transmitting device determines the second TTI length in accordance with a second buffer size associated with the second plurality of data. The first buffer size is different than the second buffer size.

Optionally, the transmitting device determines the first TTI length in accordance with a first mobility characteristic of a first receiving device. The first plurality of data is destined for the first receiving device. The transmitting device determines the second TTI length in accordance with a second mobility characteristic of a second receiving device. The second plurality of data is destined for the second receiving device. The first mobility characteristic is different than the second mobility characteristic.

Optionally, the first TTI and the second TTI are carried in a common radio frame. Optionally, the wireless channel is partitioned into at least a first band and a second band. The first band exclusively carries TTIs having the first TTI length, and the second band exclusively carries TTIs having the second TTI length.

Optionally, the transmitting device periodically transmits a first control channel carrying wireless control information in the first plurality of TTIs. A periodicity of the first control channel depends on the first TTI length. The transmitting device periodically transmits a second control channel carrying wireless control information in the second plurality of TTIs. A periodicity of the second control channel depends on the second TTI length.

Optionally, the first control channel is transmitted more often than the second control channel when the first TTI length is less than the second TTI length. The second control channel is transmitted more often than the first control channel when the first TTI length is greater than the second TTI length.

Optionally, the transmitting device periodically transmits a first control channel carrying wireless control information in the first plurality of TTIs. A periodicity of the first control channel depends on the first TTI length. The transmitting device periodically transmits a second control channel carrying uplink related control information in the first plurality of TTIs. The second control channel is de-coupled from a TTI structure of the wireless channel such that a periodicity of the second control channel is independent of the first TTI length.

Optionally, the first TTI length corresponds to a scheduling interval for the first plurality of TTIs that dictates a frequency with which wireless devices are scheduled to transmit or receive data in the wireless channel.

In accordance with embodiments, a transmitting device receives a first plurality of data destined for a receiving device. The transmitting device selects a first one of a plurality of transmission time intervals (TTI) lengths for transporting the first plurality of data. The transmitting device transmits the first plurality of data in a first TTI of the wireless channel. The first TTI has a first TTI length. The transmitting device receives a second plurality of data destined for the receiving device. The transmitting device selects a second one of a plurality of TTI lengths for transporting the second plurality of data. The transmitting device transmits the second plurality of data in a second TTI of the wireless channel. The second TTI has a second TTI length that is different than the first TTI length.

Optionally, the first TTI length is selected in accordance with a first latency requirement of the first plurality of data. The second TTI length is selected in accordance with a second latency requirement of the second plurality of data. The first latency requirement is different than the second latency requirement.

Optionally, the second plurality of data is received after the first plurality of data is transmitted. The transmitting device identifies first mobility characteristic of the receiving device upon receiving the first plurality of data. The first TTI length is selected in accordance with the first mobility characteristic. The transmitting device identifies a second mobility characteristic of the receiving device upon receiving the second plurality of data. The second TTI length is selected in accordance with the second mobility characteristic, and the first mobility characteristic is different than the second mobility characteristic.

In accordance with embodiments, a communications device receives a first plurality of data from a transmitting device via a wireless channel. The first plurality of data is transported in a first plurality of transmission time intervals (TTIs) having a first TTI length. The communications device receives a second plurality of data from the transmitting device via the wireless channel. The second plurality of data is transported in a second plurality of TTIs having a second TTI length that is different from the first TTI length.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, by an apparatus, a first indication in a first UE specific control channel from a network device, the first indication indicating a first transmission time interval (TTI) length, wherein a first periodicity of the first UE specific control channel is configurable; and receiving, by the apparatus, first data from the network device using the first TTI length.

2. The method of claim 1, further comprising:
searching, by the apparatus, the first UE specific control channel based on the first periodicity.

3. The method of claim 1, further comprising:
receiving, by the apparatus, a second indication in a second UE specific control channel from the network device, the second indication indicating a second TTI length, wherein a second periodicity of the second UE specific control channel is configurable; and receiving, by the apparatus, second data from the network device using the second TTI length.

4. The method of claim 3, further comprising:
searching, by the apparatus, the second UE specific control channel based on the second periodicity.

5. The method of claim 3, wherein the first periodicity of the first UE specific control channel is different from the second periodicity of the second UE specific control channel.

6. The method of claim 3, wherein the first data is received in a first frequency bandwidth partition, the second data is received in a second frequency bandwidth partition, and the first frequency bandwidth partition and the second frequency bandwidth partition occupy different bandwidth partitions within one carrier.

7. The method of claim 1, further comprising:
receiving, by the apparatus, a first configuration of a third periodicity for searching for a first uplink (UL) grant within a third frequency bandwidth partition.

8. The method of claim 7, further comprising:
receiving, by the apparatus, a second configuration of a fourth periodicity for searching for a second UL grant within a fourth frequency bandwidth partition, wherein the third periodicity is different from the fourth periodicity, and the third frequency bandwidth partition and the fourth frequency bandwidth partition occupy different bandwidth partition within one carrier.

9. A method of communicating data, the method comprising:
sending, by a network device, a first indication in a first UE specific control channel to a user equipment (UE), the first indication indicating a first transmission time interval (TTI) length, wherein a first periodicity of the first UE specific control channel is configurable; and sending, by the network device, first data to the UE using the first TTI length.

10. The method of claim 9, further comprising:
sending, by the network device, the first UE specific control channel based on the first periodicity.

11. The method of claim 9, further comprising:
sending, by the network device, a second indication in a second UE specific control channel to the UE, the second indication indicating a second TTI length, wherein a second periodicity of the second UE specific control channel is configurable; and sending, by the network device, second data to the UE using the second TTI length.

12. The method of claim 11, further comprising:
sending, by the network device, the second UE specific control channel based on the second periodicity.

13. The method of claim 11, wherein the first periodicity of the first UE specific control channel is different from the second periodicity of the second UE specific control channel.

14. The method of claim 11, wherein the first data is sent in a first frequency bandwidth partition, the second data is sent in a second frequency bandwidth partition, and the first frequency bandwidth partition and the second frequency bandwidth partition occupy different bandwidth partitions within one carrier.

15. The method of claim 9, further comprising:
sending, by the network device, a first configuration of a third periodicity for searching for a first uplink (UL) grant within a third frequency bandwidth partition.

16. The method of claim 15, further comprising:
sending, by the network device, a second configuration of a fourth periodicity for searching for a second UL grant within a fourth frequency bandwidth partition, wherein the third periodicity is different from the fourth periodicity, and the third frequency bandwidth partition and the fourth frequency bandwidth partition occupy different bandwidth partition within one carrier.

17. A network device for communicating data, the network device comprising:
a processor; and
a non-transitory computer readable storage medium storing programming for execution by the processor, the programming including instructions to:
send a first indication in a first UE specific control channel to a user equipment (UE), the first indication indicating a first transmission time interval (TTI) length, wherein a first periodicity of the first UE specific control channel is configurable; and
send first data the UE using the first TTI length.

18. The network device of claim 17, the programming further including instructions to:
send the first UE specific control channel based on the first periodicity.

19. The network device of claim 17, the programming further including instructions to:
send a second indication in a second UE specific control channel to the UE, the second indication indicating a second TTI length, wherein a second periodicity of the second UE specific control channel is configurable; and
send second data to the UE using the second TTI length.

20. The network device of claim 19, the programming further including instructions to:
send the second UE specific control channel based on the second periodicity.

21. The network device of claim 19, wherein the first periodicity of the first UE specific control channel is different from the second periodicity of the second UE specific control channel.

22. The network device of claim 19, wherein the first data is sent in a first frequency bandwidth partition, the second data is sent in a second frequency bandwidth partition, and the first frequency bandwidth partition and the second frequency bandwidth partition occupy different bandwidth partitions within one carrier.

23. The network device of claim 17, the programming further including instructions to:
send a first configuration of a third periodicity for searching for a first uplink (UL) grant within a third frequency bandwidth partition.

24. The network device of claim 23, the programming further including instructions to:

send a second configuration of a fourth periodicity for searching for a second UL grant within a fourth frequency bandwidth partition, wherein the third periodicity is different from the fourth periodicity, and the third frequency bandwidth partition and the fourth frequency bandwidth partition occupy different bandwidth partition within one carrier.

25. An apparatus of communicating data, the apparatus comprising:
a non-transitory memory storage medium comprising instructions; and
one or more processors in communication with the non-transitory memory storage medium, wherein the one or more processors execute the instructions to:
receive a first indication in a first UE specific control channel from a network device, the first indication indicating a first transmission time interval (TTI) length, wherein a first periodicity of the first UE specific control channel is configurable; and
receive first data from the network device using the first TTI length.

26. The apparatus of claim 25, the one or more processors further execute the instructions to:
search the first UE specific control channel based on the first periodicity.

27. The apparatus of claim 25, the one or more processors further execute the instructions to:
receive a second indication in a second UE specific control channel from the network device, the second indication indicating a second TTI length, wherein a second periodicity of the second UE specific control channel is configurable; and
receive second data from the network device using the second TTI length.

28. The apparatus of claim 27, the one or more processors further execute the instructions to:
search the second UE specific control channel based on the second periodicity.

29. The apparatus of claim 27, wherein the first periodicity of the first UE specific control channel is different from the second periodicity of the second UE specific control channel.

30. The apparatus of claim 27, wherein the first data is received in a first frequency bandwidth partition, the second data is received in a second frequency bandwidth partition, and the first frequency bandwidth partition and the second frequency bandwidth partition occupy different bandwidth partitions within one carrier.

31. The apparatus of claim 25, the one or more processors further execute the instructions to:
receive a first configuration of a third periodicity for searching for a first uplink (UL) grant within a third frequency bandwidth partition.

32. The apparatus of claim 31, the one or more processors further execute the instructions to:
receive a second configuration of a fourth periodicity for searching for a second UL grant within a fourth frequency bandwidth partition, wherein the third periodicity is different from the fourth periodicity, and the third frequency bandwidth partition and the fourth frequency bandwidth partition occupy different bandwidth partition within one carrier.

33. A network system, comprising:
a network entity in a backhaul network communicating with a base station; and
the base station, the base station performs operations of:
sending a first indication in a first UE specific control channel to a user equipment (UE), the first indication indicating a first transmission time interval (TTI) length, wherein a first periodicity of the first UE specific control channel is configurable; and
sending first data to the UE using the first TTI length.

34. The network system of claim 33, the operations further comprising:
sending the first UE specific control channel based on the first periodicity.

35. The network system of claim 33, the operations further comprising:
sending a second indication in a second UE specific control channel to the UE, the second indication indicating a second TTI length, wherein a second periodicity of the second UE specific control channel is configurable; and
sending second data to the UE using the second TTI length.

36. The network system of claim 35, the operations further comprising:
sending the second UE specific control channel based on the second periodicity.

37. The network system of claim 35, wherein the first periodicity of the first UE specific control channel is different from the second periodicity of the second UE specific control channel.

38. The network system of claim 35, wherein the first data is sent in a first frequency bandwidth partition, the second data is sent in a second frequency bandwidth partition, and the first frequency bandwidth partition and the second frequency bandwidth partition occupy different bandwidth partitions within one carrier.

39. The network system of claim 33, the operations further comprising:
sending a first configuration of a third periodicity for searching for a first uplink (UL) grant within a third frequency bandwidth partition.

* * * * *